United States Patent
Paunov

(10) Patent No.: US 10,017,086 B2
(45) Date of Patent: Jul. 10, 2018

(54) REMOVABLE CART ASSEMBLY FOR VEHICLES

(71) Applicant: Ranger Design, Montreal (CA)

(72) Inventor: Ilko Paunov, Laval (CA)

(73) Assignee: Ranger Design, Montreal, QC (CA)

( * ) Notice: Subject to any disclaimer, the term of this patent is extended or adjusted under 35 U.S.C. 154(b) by 0 days.

(21) Appl. No.: 15/421,685

(22) Filed: Feb. 1, 2017

(65) Prior Publication Data

US 2017/0217358 A1 Aug. 3, 2017

Related U.S. Application Data

(60) Provisional application No. 62/289,520, filed on Feb. 1, 2016.

(51) Int. Cl.
| | |
|---|---|
| *B62B 5/00* | (2006.01) |
| *B60N 3/00* | (2006.01) |
| *A47B 43/00* | (2006.01) |
| *B60R 5/00* | (2006.01) |
| *B60P 7/08* | (2006.01) |
| *B62B 5/04* | (2006.01) |
| *A47B 57/04* | (2006.01) |

(52) U.S. Cl.
CPC .............. *B60N 3/001* (2013.01); *A47B 43/00* (2013.01); *B60P 7/0815* (2013.01); *B60R 5/003* (2013.01); *B62B 5/0495* (2013.01); *A47B 57/04* (2013.01)

(58) Field of Classification Search
CPC .............................. B60P 7/0815; B62B 5/0495
USPC ....... 410/66, 67, 84, 32, 33; 280/47.35, 79.3
See application file for complete search history.

(56) References Cited

U.S. PATENT DOCUMENTS

| | | | | |
|---|---|---|---|---|
| 2,950,126 | A * | 8/1960 | Armentrout | B60P 3/073 410/66 |
| 3,891,102 | A * | 6/1975 | Blount | B60P 1/4421 410/67 |
| 2014/0205392 | A1* | 7/2014 | Wisniewski | B60P 1/6418 410/66 |
| 2015/0191189 | A1* | 7/2015 | Disorbo | B62B 3/004 280/47.35 |

* cited by examiner

*Primary Examiner* — Stephen Gordon
(74) *Attorney, Agent, or Firm* — William H. Honaker; Dickinson Wright PLLC

(57) ABSTRACT

The present invention is a removable storage system for use in a vehicle which allows a storage cart to be rolled into and out of the vehicle and secured within the vehicle. The storage system includes a support assembly adapted to be mounted within a vehicle. The support system has at least one horizontal member extending along the longitudinal side of the vehicle. The movable cart has at least one surface for supporting items, and a locking mechanism for locking the cart to the support system. The horizontal member includes at least one retention member to resist movement of the moveable cart in the longitudinal direction. The locking mechanism engages the horizontal member to lock the cart to the horizontal member to resist movement of the moveable cart in the lateral direction.

8 Claims, 5 Drawing Sheets

REMOVABLE CART ASSEMBLY FOR VEHICLES

RELATED APPLICATIONS

This application claims the benefit of U.S. Provisional Application No. 62/289,520 filed on Feb. 1, 2016, the entire disclosure of the application being considered part of the disclosure of this application and hereby incorporated by reference.

STATEMENT REGARDING FEDERALLY SPONSORED RESEARCH

NONE.

TECHNICAL FIELD

This invention relates generally to storage units in motor vehicles and more specifically to a moveable storage unit that can be easily rolled into and out of a motor vehicle.

BACKGROUND OF THE INVENTION

Various types of product storage, such as shelving, bin shelving, fold away shelving and drawer systems are known for cargo vans, cube vans, transit vehicles, etc. All of these various product storage solutions for vehicles require that product be carried into the vehicle and placed on the storage unit. Additionally, they require that the product be removed from the storage unit to be removed from the vehicle.

What is needed in many situations is a storage unit that can be moved into a vehicle on for example wheels and secured in the vehicle and alternatively removed from the vehicle. For example, such a storage unit would be useful in package delivery vehicles. The storage unit could be loaded with packages to be delivered and then pushed into the vehicle and secured to the vehicle. Once deliveries are completed, the storage unit can be rolled out of the vehicle to be reloaded.

Such a storage system would also be desirable for securing valuable cargo in a secured structure outside of the vehicle. The cargo, such as expensive tools, parts or other equipment, would be rolled into and secured inside the vehicle when needed. When finished, the cargo could be rolled into a building and secured for the evening and not left in a relatively less secure vehicle.

SUMMARY OF THE INVENTION

In general terms, this invention provides a storage unit, and as disclosed, a shelving unit that can be easily rolled into and secured within a vehicle and released and rolled out of the vehicle.

The removable storage system of the present invention includes a support assembly adapted to be mounted within a vehicle. The support system has at least one horizontal member extending along the longitudinal side of the vehicle. A movable cart is provided which has at least one surface and as disclosed a plurality of shelves for supporting items, and a locking mechanism for locking the cart to the support system.

The horizontal member includes at least one retention member to resist movement of the moveable cart in the longitudinal direction. The locking mechanism engages the horizontal member to lock the cart to the horizontal member to resist movement of the moveable cart in the lateral direction.

The horizontal member is mounted to the vertical posts and in the disclosed embodiment, there are two spaced horizontal members mounted to the vertical posts. Further, the moveable cart includes opposed side walls, a plurality of opposed slots in the sidewalls, for supporting the shelves. The moveable cart is mounted upon wheels for rolling the cart.

The locking mechanism includes a locking hook rotatable between a released position and a locked position. The locking mechanism includes a trigger and a catch. The catch has a locked position and released position. The trigger selectively engages in the locked and released position.

These and other features and advantages of this invention will become more apparent to those skilled in the art from the detailed description of a preferred embodiment. The drawings that accompany the detailed description are described below.

DETAILED DESCRIPTION OF A PREFERRED EMBODIMENT

Figure 1:
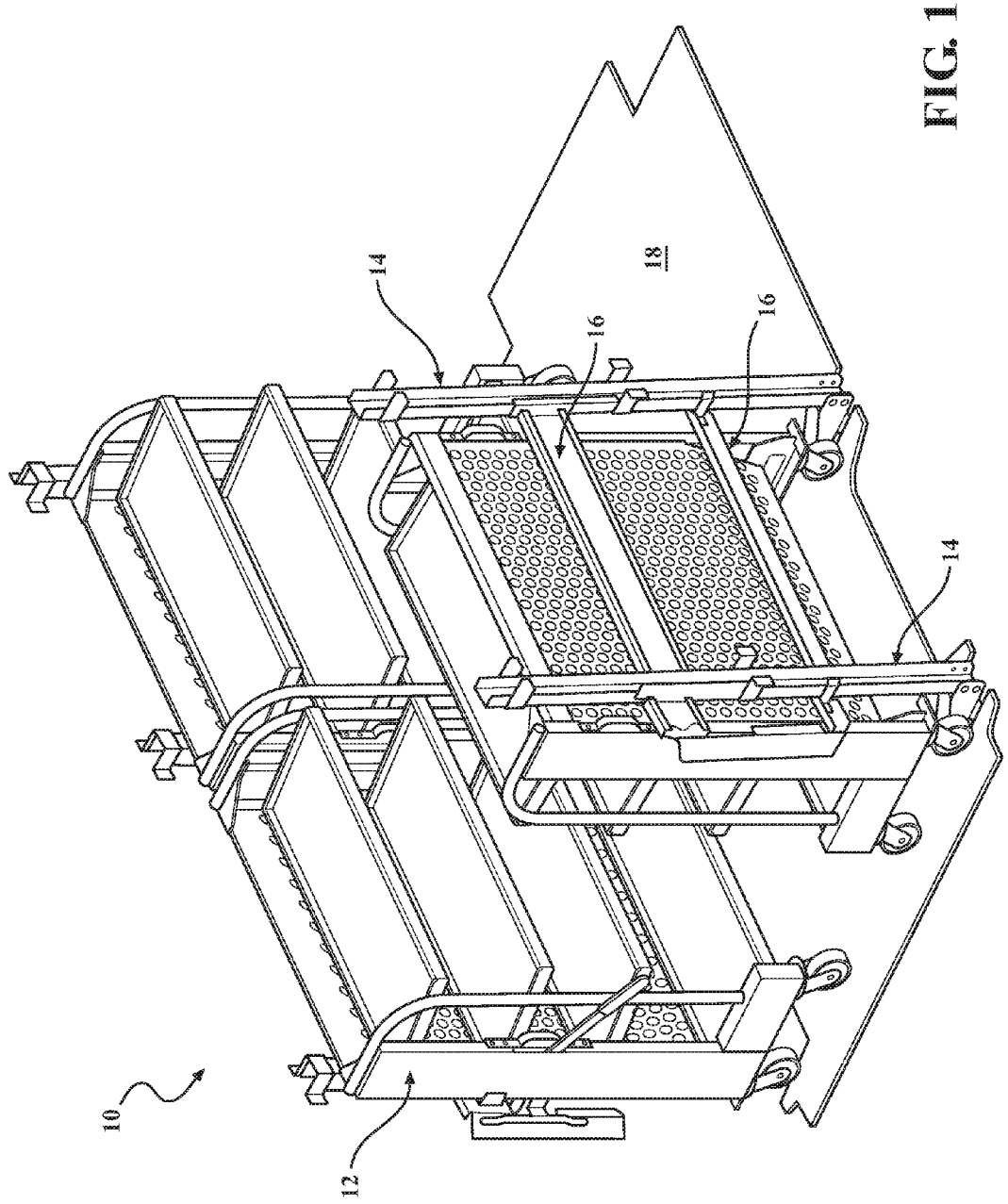
FIG. 1 is a perspective view of the removable cart assembly for vehicles of the present invention.

The removable cart assembly of the present invention is shown generally at 10 in FIG. 1. The removable cart assembly 10 includes a storage cart 12, a support framework that includes vertical posts 14 and horizontal supports 16. A floor mat 18 is mounted upon the vehicle floor.

Figure 2:
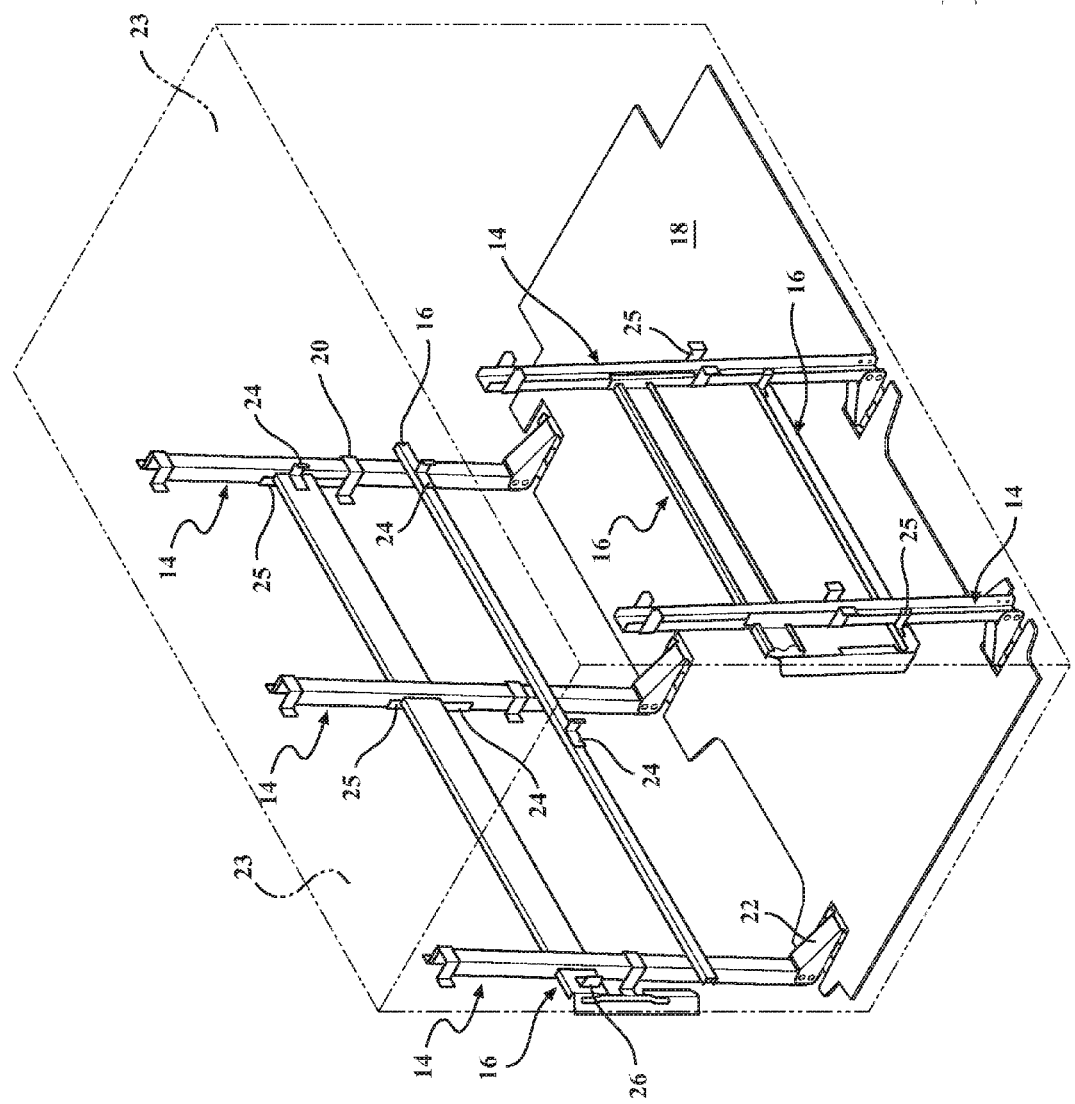
FIG. 2 is a perspective view of a removable cart assembly for vehicles of the present invention.

With reference to FIG. 2, the vertical posts 14 and horizontal supports 16 are illustrated. The vertical posts 14 are mounted to the interior wall of a vehicle shown generally at 23. In the disclosed embodiment, u-shaped brackets 20 mount the vertical posts 14 to the interior wall of the vehicle 23. Foot brackets 22 mount the vertical posts 14 to the floor of the vehicle. The horizontal supports 16 are mounted to the vertical posts 14 through brackets 25. The horizontal supports 16 provide additional support to the vertical posts 14. The upper horizontal support 16 also provides the surface to which the cart 12 is mounted within the vehicle.

The horizontal supports 16 include retention members which in the disclosed embodiment are shown as catches 24 and stops 26. The catches 24 in the disclosed embodiment are on the upper and lower horizontal supports 16 and the stops 26 are on the upper horizontal supports 16. The catches 24 as shown are generally u-shaped brackets and the stop 26 is a outwardly projecting tab. It should be appreciated by those of ordinary skill in the art that the catches 24 and stops 26 could take different shapes, such as both being projections, rubber bumpers, etc., and that the retention members could also be on the top only, the bottom only, the top and bottom etc.

Figure 3:
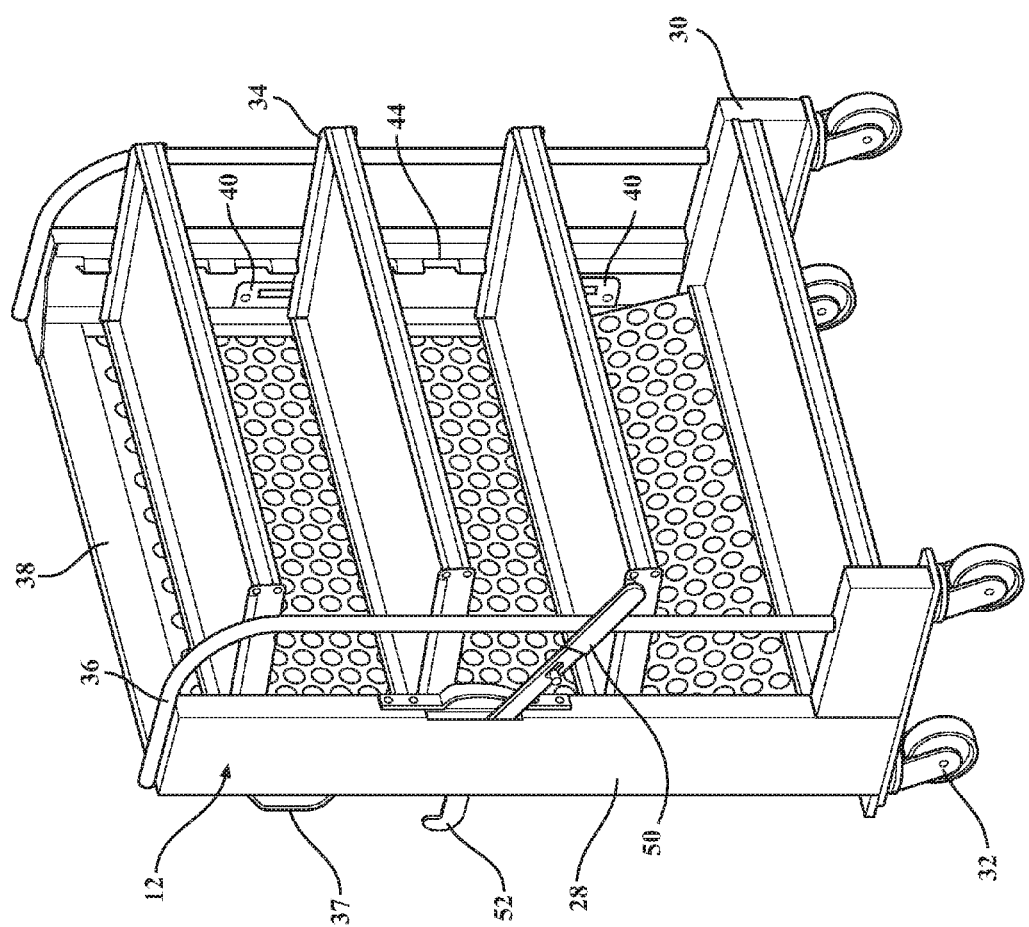
FIG. 3 is a perspective view of the support framework of the removable cart assembly for vehicles of the present invention.
Figure 4:
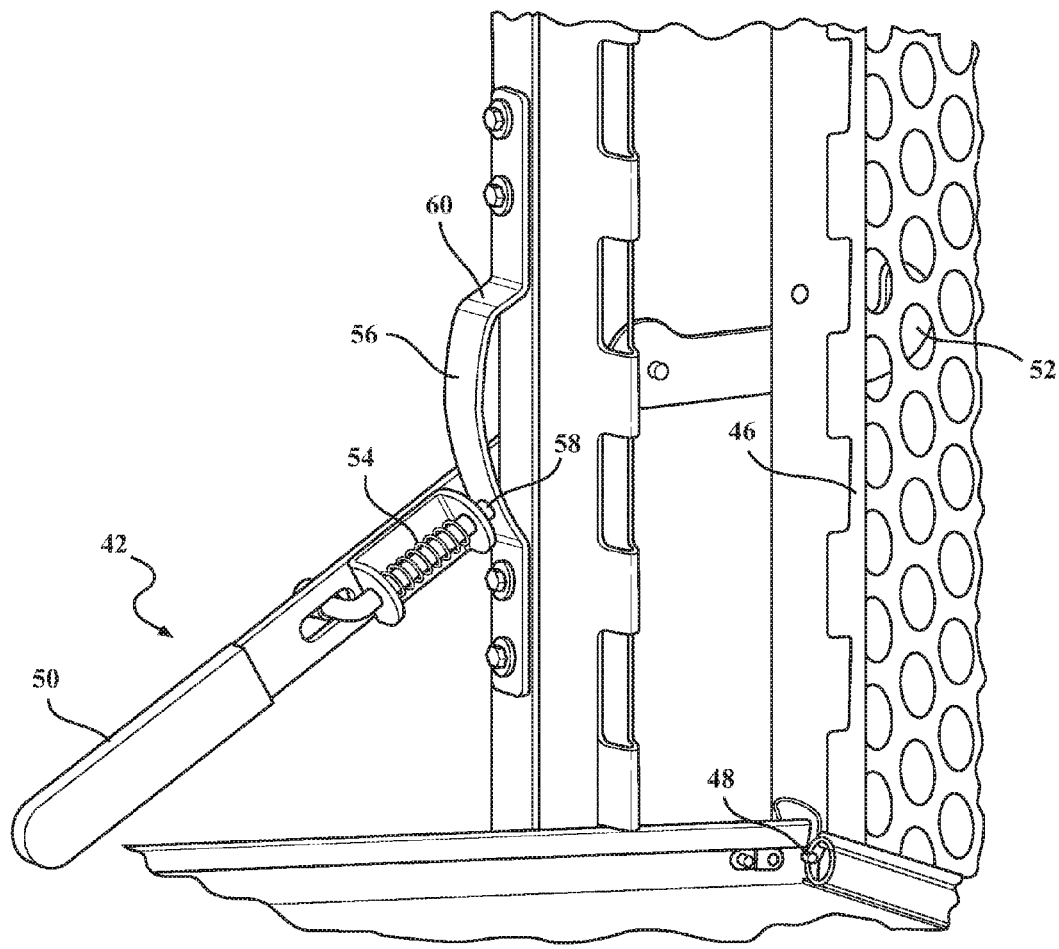
FIG. 4 is a side view of the removable cart assembly for vehicles of the present invention.
Figure 5:
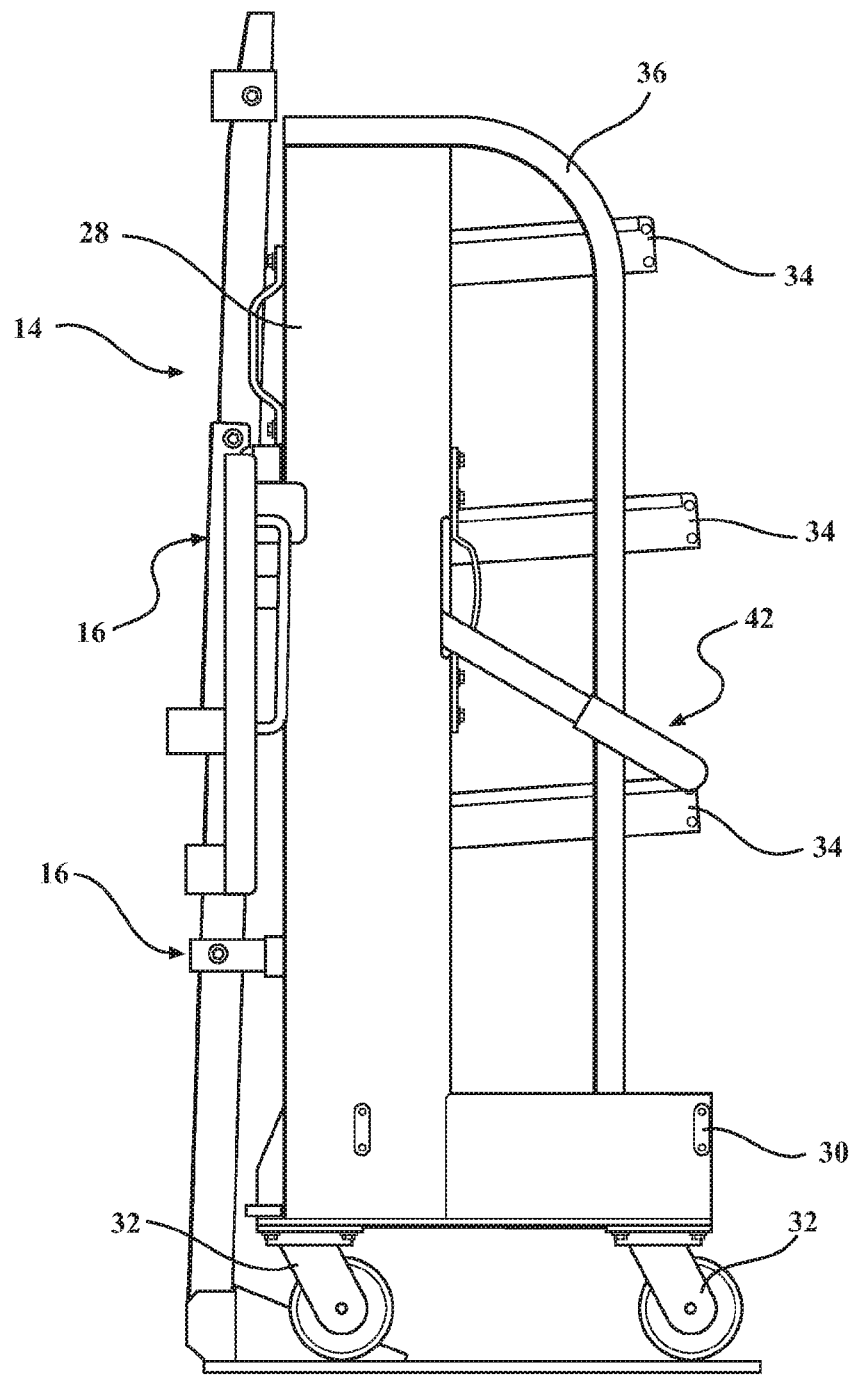
FIG. 5 is a view of the latch mechanism of the removable cart assembly for vehicles of the present invention.

With reference to FIGS. 3, 4, and 5, the cart 12 will be more fully described. The cart 12 has opposed side walls 28 and in the disclosed embodiment, opposed foot members 30 which extend outwardly from the side walls 28. In the disclosed embodiment, wheels 32 are mounted to the foot members 30. The wheels 32 allow the cart 12 to be easily rolled into and out of the vehicle. Opposed front rails 36 and handles 37 are mounted to the cart 12 to facilitate moving the cart in to and out of the vehicle. The disclosed embodiment also includes a back member 38. The carts 12 as illustrated include a plurality of shelves 34. In the disclosed embodiment, the shelves 34 are inserted into opposed slots 44. Each of the side walls 28 have a series of slots 44 for receipt of the shelves 34. The number and position of the shelves 34 can be easily changed by sliding the shelves 34 into and out of the slots 44. A pin 48 is inserted into a hole 46 to secure the shelves in the cart 12.

When the cart 12 is moved into the vehicle 23, the catches 24 are first inserted into the slots 40 of the cart 12 and the cart is pushed against the horizontal supports 16. The stops 26 engage or are at least closely adjacent to the opposed side wall 28. Once positioned against the horizontal supports 16, the locking latch mechanism 42 is engaged and locks the cart in position within the vehicle 23.

The locking mechanism 42 of the disclosed embodiment includes a handle 50 that is connected to a locking hook 52. The locking hook 52 is rotated under the upper horizontal support 16. The hook 52 locks the cart to the horizontal support 16. The locking mechanism 42 includes a spring loaded trigger 54 that engages a catch 56. The catch 56 has an opening 58 that receives the trigger 54 when in the latch position. The catch 56 also has a detent 60 that receives the trigger 54 when the locking mechanism is in the unlatched position.

In use, the shelves 34 of the cart 12 can be loaded with items. This can be done outside of the vehicle 23. Once loaded, the cart 12 can be rolled on wheels 32 into the vehicle 23. The cart 12 is pushed against the catches 24 which are received in the slots 40. The cart 12 is then pushed against the horizontal supports 16 adjacent the stop 26. The catches 24 and stop 26 resist movement of the cart 12 longitudinally with respect to the vehicle 23. Once positioned against the horizontal support 16, the locking latch 42 is engaged. To engage the latch 42, the trigger 54 is pulled against the bias of the spring and the handle is rotated downwardly to the latched position. In the latched position, the trigger 54 is received in the hole 58 of the catch 56.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

I claim:

1. A removable storage system for use in a vehicle, said removable storage system comprising:
   a support assembly adapted to be mounted within a vehicle; said support system having at least one horizontal member extending along a side of said vehicle;
   a movable cart having at least one surface for supporting items, and a locking mechanism for locking said cart to said support system;
   said horizontal member including at least one retention member to resist movement of said moveable cart;
   said locking mechanism engaging said horizontal member to lock said cart to said horizontal member to resist movement of said moveable cart:
   said locking mechanism includes a trigger and a catch, said catch having a locked position and release position, said trigger selectively engaging said locked and release position,
   said trigger is spring loaded and said catch includes an opening for receipt of said trigger in said locked position and a detent for receipt of said trigger in said release position.

2. The removable storage system of claim 1, wherein said support assembly includes vertical posts, said vertical posts having mounting brackets for mounting said vertical posts to a vehicle.

3. The removable storage system of claim 2, wherein said horizontal member is mounted to said vertical posts.

4. The removable storage system of claim 1, wherein said support system includes two spaced horizontal members.

5. The removable storage system of claim 1, wherein said at least one surface for supporting items includes a plurality of spaced shelves.

6. The removable storage system of claim 5, wherein said moveable cart includes opposed side walls, a plurality of opposed slots in said sidewalls, said shelves supported within said slots.

7. The removable storage system of claim 1, wherein said moveable cart includes wheels for rolling said cart.

8. The removable storage system of claim 1, wherein said locking mechanism includes a locking hook rotatable between a released position and a locked position.

* * * * *